United States Patent [19]

Kressin et al.

[11] Patent Number: 5,617,527
[45] Date of Patent: Apr. 1, 1997

[54] METHOD FOR ADDING A GRAPHICAL USER INTERFACE TO A COMMAND LINE APPLICATION

[75] Inventors: Mark S. Kressin, Niwot; Blaine H. Berger; Bret P. Smith, both of Longmont, all of Colo.

[73] Assignee: International Business Machines Corporation, Armonk, N.Y.

[21] Appl. No.: 587,568

[22] Filed: Jan. 17, 1996

Related U.S. Application Data

[63] Continuation of Ser. No. 33,218, Mar. 18, 1993, abandoned.

[51] Int. Cl.$^6$ ....................................................... G06F 3/14
[52] U.S. Cl. ........................... 395/326; 395/340; 395/354
[58] Field of Search ..................................... 395/155, 156, 395/157, 158, 159, 160, 161, 275, 500, 600, 700; 345/156; 379/93

[56] References Cited

U.S. PATENT DOCUMENTS

| | | | |
|---|---|---|---|
| 4,586,158 | 4/1986 | Brandle. | |
| 4,783,759 | 11/1988 | Borgendale et al.. | |
| 4,905,181 | 2/1990 | Gregory | 395/275 |
| 5,051,898 | 9/1991 | Wright et al.. | |
| 5,086,504 | 2/1992 | Nemeth-Johannes et al.. | |
| 5,113,517 | 5/1992 | Beard et al. | 395/500 |
| 5,179,657 | 1/1993 | Dykstal et al.. | |
| 5,252,951 | 10/1993 | Tannenbaum et al. | 345/156 |
| 5,287,514 | 2/1994 | Gram | 395/700 |
| 5,311,577 | 5/1994 | Madrid et al. | 379/93 |
| 5,339,433 | 8/1994 | Frid-Nielsen | 395/700 |
| 5,412,776 | 5/1995 | Bloomfield et al. | 395/160 |

*Primary Examiner*—Mark R. Powell
*Assistant Examiner*—Ruay Lian Ho
*Attorney, Agent, or Firm*—Joseph C. Redmond, Jr.; Mark Walker

[57] ABSTRACT

This method improves the user-friendliness of command-line driven programs by having a correspondence set up between possible commands which may be entered on a command line and a series of Graphic User Interface "buttons". These buttons are graphical symbols that appear on the screen and are selectable via a mouse. A display screen is divided into work areas, one of which is associated with the screen which a user would have seen while using the application program without the invention and a second of which displays an array of "buttons," each of which are associated with commands. When the user selects the specific button with a mouse pointer moving the mouse, the related "command" is identified. A message is then created, the message comprised of the same data that would have been created by the series of keystrokes to spell out that command. The command is passed to the application program, which receives it in the same manner that it would have received input from the keyboard. Accordingly, the application program recognizes the data as a command and executes the desired function.

10 Claims, 4 Drawing Sheets

FIG. 1
PRIOR ART

```
SAMPLE    SCRIPT    A1   V   132   Trun=132   Size=25   Line=4   Col=1   Alt=0

0    * * * Top of File * * *
 1    Memorandum To: Staff
 2
 3    Date: February 13, 1993
 4
 5    All members of the staff are requested to attend a
 6    meeting on Thursday, February 20, 1993 in Conference
 7    Room 201. The meeting will start at 9:00 A.M. Coffee
 8    and donuts will be available at 8:30 A.M.
 9
10    The purpose of the meeting is to discuss the strategic
11    direction the department will take over the next six
12    months.
13
14
15
16
17
18
====
1=Hlp  2=Add  3=Quit  4=Tab  5=SChg  6=?  7=Bkwd  8=Fwd  9=Rpt  10=R/L  11=Sp/Jn  12=Curs
```

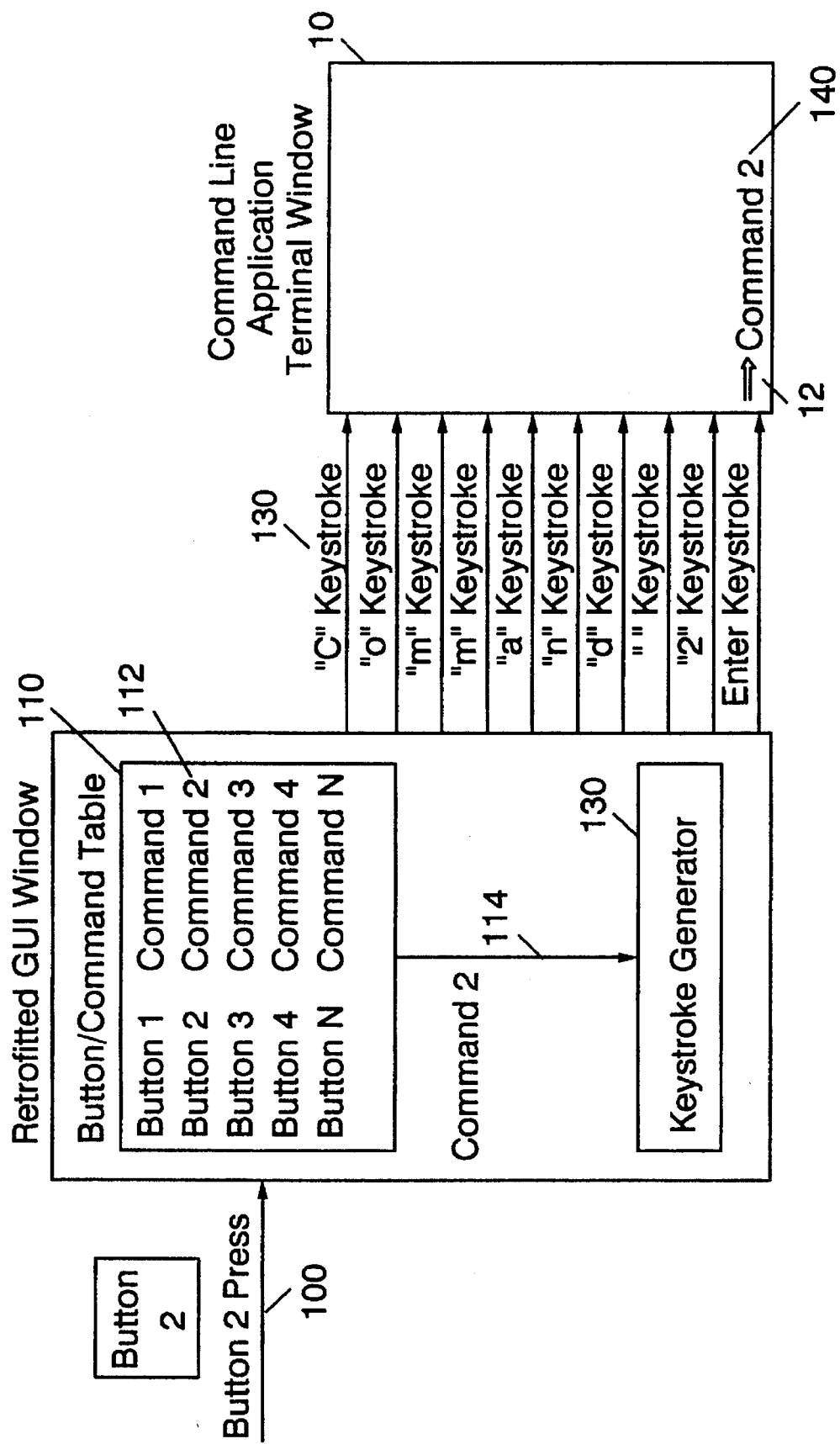

5,617,527

METHOD FOR ADDING A GRAPHICAL USER INTERFACE TO A COMMAND LINE APPLICATION

This application is a Continuation of U.S. patent application Ser. No. 08/033,218, filed Mar. 18, 1993 abandoned.

FIELD OF THE INVENTION

This invention relates to improving the user friendly characteristics of computer programs which accept commands from a command line. Specifically, this invention relates to a method which can be used to convert command line driven applications to applications using screens or panels.

BACKGROUND OF THE INVENTION

In the prior art, many programs used the device of a "command line." For example, the AIX (™, International Business Machines, Corp.) operating system provides the user with a prompt indicating that the AIX program is expecting user input. This prompt is considered a command line from which the user can submit a command to be processed by the AIX program.

Another example of a program that has a command line is text or word-processing programs which would use this device to distinguish between the entering of text and the entering of a command. In a typical implementation, a user at a keyboard would enter text through a keyboard. An example of a screen display of a text processing program of this type is shown in FIG. 1. As can be seen from FIG. 1, the text would be displayed in a working area (1) which usually comprised the majority of the display area. If the user wished to enter a command, that is, wished to have the word processing program execute a function, the operator would direct the cursor displayed on the display screen into a command line area (5). When the cursor entered the command line area, any characters typed at the keyboard would be interpreted by the word processing program as a command, rather than as text, and would respond by performing the indicated command function. In the prior art, the command line was normally a stationary area located at either the bottom of the display screen (as in FIG. 1) or at the top of the display screen.

While this implementation enabled a program to successfully distinguish between text and commands, its primary drawback was that it was not user friendly. Prior art recognized this problem and tried to ameliorate the situation. For example, U.S. Pat. No. 4,783,759, Borgendale et al., discloses a floating command line. This attempted to solve the problem of requiring the user to move the cursor to one or the other of the extremes of the screen. Borgendale did not address, however, the more basic problems of a command line implementation: first, that a user had to remember the commands, and second, that the user had to type the command correctly. Attempts were made to solve the user's memory problems: some programs assigned certain commands to program function keys and provided cardboard or plastic templates to prompt the user. The drawback to this approach was that, if more than 12 commands needed to be identified, awkward keystrokes were required, ex. alt/pf1 and the templates (which had to cover 36 variations—12 program function keys combined with the ALT, SHIFT, and CONTROL KEYS) became hard to read.

As the use of the personal computer (PC) spread, user friendliness became a critical factor in the commercial success of programs. PC users would typically acquire a number of programs, each with a specific purpose. For example, a typical user might have a spreadsheet such as Lotus-1-2-3 (™, Lotus Development Corp.), a word processor such as WordPerfect (™, WordPerfect Corp.), and a graphics program. Since each of the programs was specialized, it was not unusual for a program to be used only sporadically, with days, weeks or even months lapsing between each use. In such an environment, the drawbacks of command-line driven applications became more critical: trying to remember different commands for each different program after a hiatus was an annoyance; typing the command (with its potentially unique spelling) correctly could be a major problem.

The increasing sophistication of the graphical capabilities of the PC displays offered one way of solving these problems. Using graphical user interface (GUI) techniques, programmers were able to develop alternatives to command lines. For example, using GUI, a set of "buttons" or target areas would be displayed on the screen. The user could select one of the buttons by using the mouse to move the mouse pointer over the button and then pressing a mouse button. The action of selecting the button indicates to the application program that a specific action is desired—namely, a command correlated with the button. Since the user need only move the mouse, the problem of mis-typing is eliminated. Since the buttons on the screen could be varied to display only those applicable at a given point in a program execution, the busy template problem is avoided. Finally, by using a hierarchy of menus of buttons, an unlimited number of buttons (a.k.a. commands) could be provided to the user.

GUI techniques were a boon to programmers who were writing new programs. There remained, however, the problem of a sizable body of pre-existing programs. Typically, great expense is required to attach a Graphical User Interface to an existing application. Usually, the existing application is re-written and as a result, must be re-tested.

Further, coexistence of GUI programs and command driven programs caused certain difficulties. Not only did the user friendliness of GUI programs magnify the user-unfriendliness of command driven program by their contrast, the users were now faced with two different "standards" of program implementation. In an environment where differences between panels were considered a drawback (refer U.S. Pat. No. 5,179,657, Dyktal, et al.), the difference between GUI and the command line was a major problem. It became clear that to protect the investment base of pre-existing programs, an economic way of converting them to GUI presentation was required.

OBJECTIVES OF THE INVENTION

Accordingly, it is an objective of this invention to provide a simple means of improving the user friendliness of programs.

It is a further objective of the invention to provide a technique whereby a graphical user interface can be added to an application based on command-lines.

It is a further objective of the invention to add a graphical user interface in a simple, cost-effective manner which does not require rewriting the application and also does not require extensive re-testing.

SUMMARY OF THE INVENTION

According to the invention, a correspondence is set up between possible commands which may be entered on a command line and a series of Graphic User Interface "buttons". These buttons are graphical symbols that appear on the screen and are selectable via the mouse. As is shown in FIG. 3, one work area (10) of a display screen (1) is associated with the screen which a user would have seen had he been using the application program without the invention. A second area of the screen (20) is set aside for a display of "buttons" (22) which are associated with commands. When a user selects the specific button with a mouse pointer (25) by moving the mouse (30), the related "command" is identified. Thus, associated with the specific button is a message which is comprised of the same data that would have been created by the series of keystrokes to spell out that command. The message is passed to the application program, which receives it in the same manner that it would have received command input from the keyboard. Accordingly, the application program recognizes the data as a command and executes the desired function.

BRIEF DESCRIPTION OF THE DRAWINGS

These and other objects, features and advantages of the invention will be more fully appreciated with reference to the accompanying figures.

FIG. 1 illustrates a display screen of a command-line driven application program.

PIG. 3 illustrates the display screen of the invention.

FIG. 4 is a graphical representation showing the process by which a GUI is added to a command line program.

DETAILED DESCRIPTION OF THE INVENTION

Figure 3:
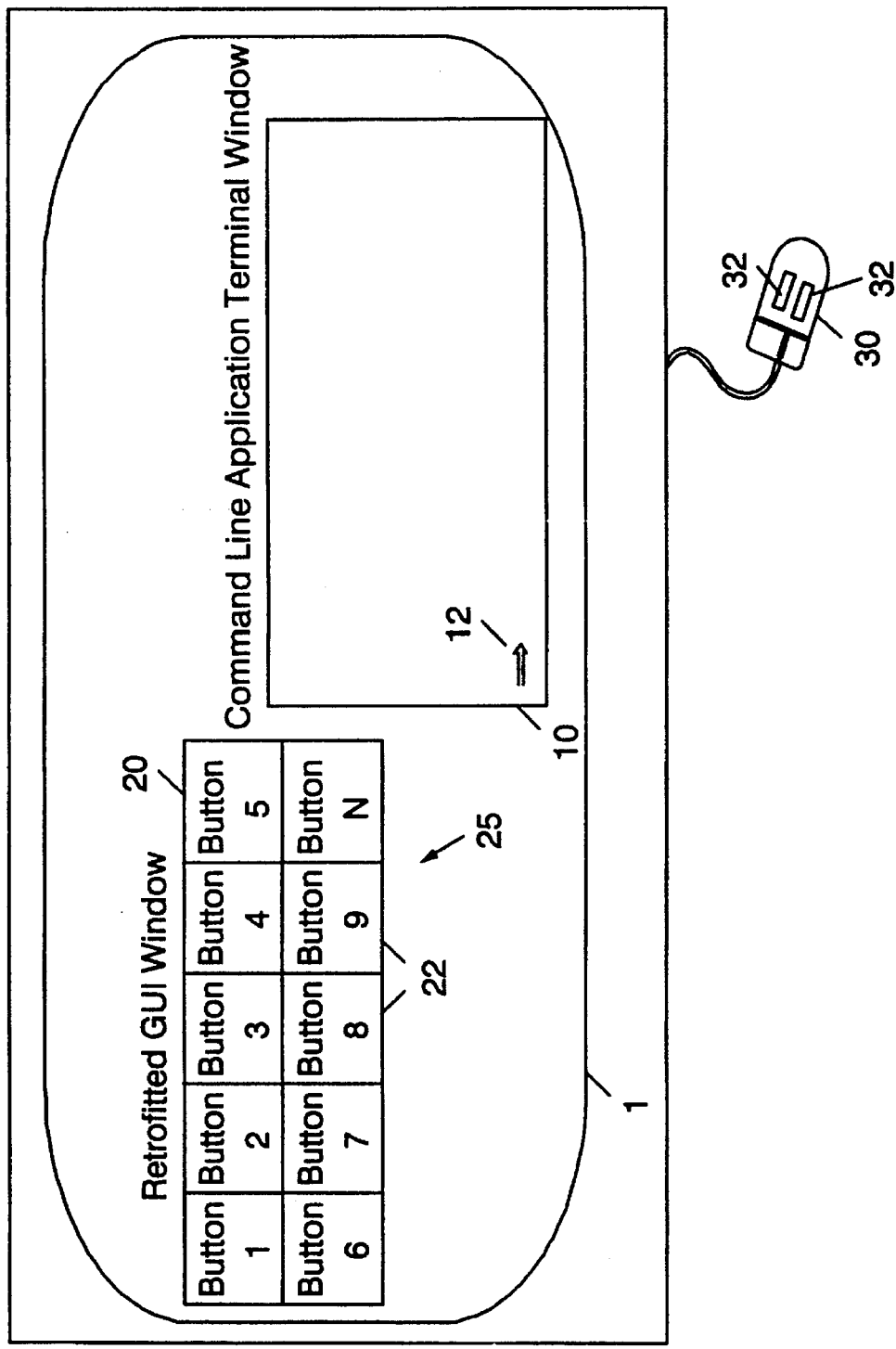

In order to understand the invention, it is helpful to consider the operation of the invention as seen by the user. It should first be understood that the invention relies on a concept called a window. A window is a method of displaying data to a user. It shields the user from the complexity of operating systems and, at the same time, allows the user to see multiple programs at the same time. (FIG. 3 shows a display screen (1) with two windows (10 and 20).

In the preferred embodiment, the invention operates under the X-Windows environment on an AIX system. Specifically, the invention uses IBM's AIXwindows, operating under AIX Version 3.2. The system used was an IBM RISC System/6000 workstation Model 530. The workstation consists of a display screen with a keyboard and mouse and processor unit. Within the processor unit is a memory, an execution unit (which executes stored program instructions contained in the memory), a hard drive and various adapters for peripherals.

One of the functions of AIXwindows' development environment is the XSendEvent call which is used to communicate between the GUI program and the terminal window of the command line application. Thus, XSendEvent allows the programmer to simulate window events such as a keyboard or mouse button press. It is an X-Window Version 11 standard.

As an alternative implementation, any UNIX (™, Unix Systems Laboratories, Inc.) operating system that support the X-Windows standards may be used.

Figure 2:
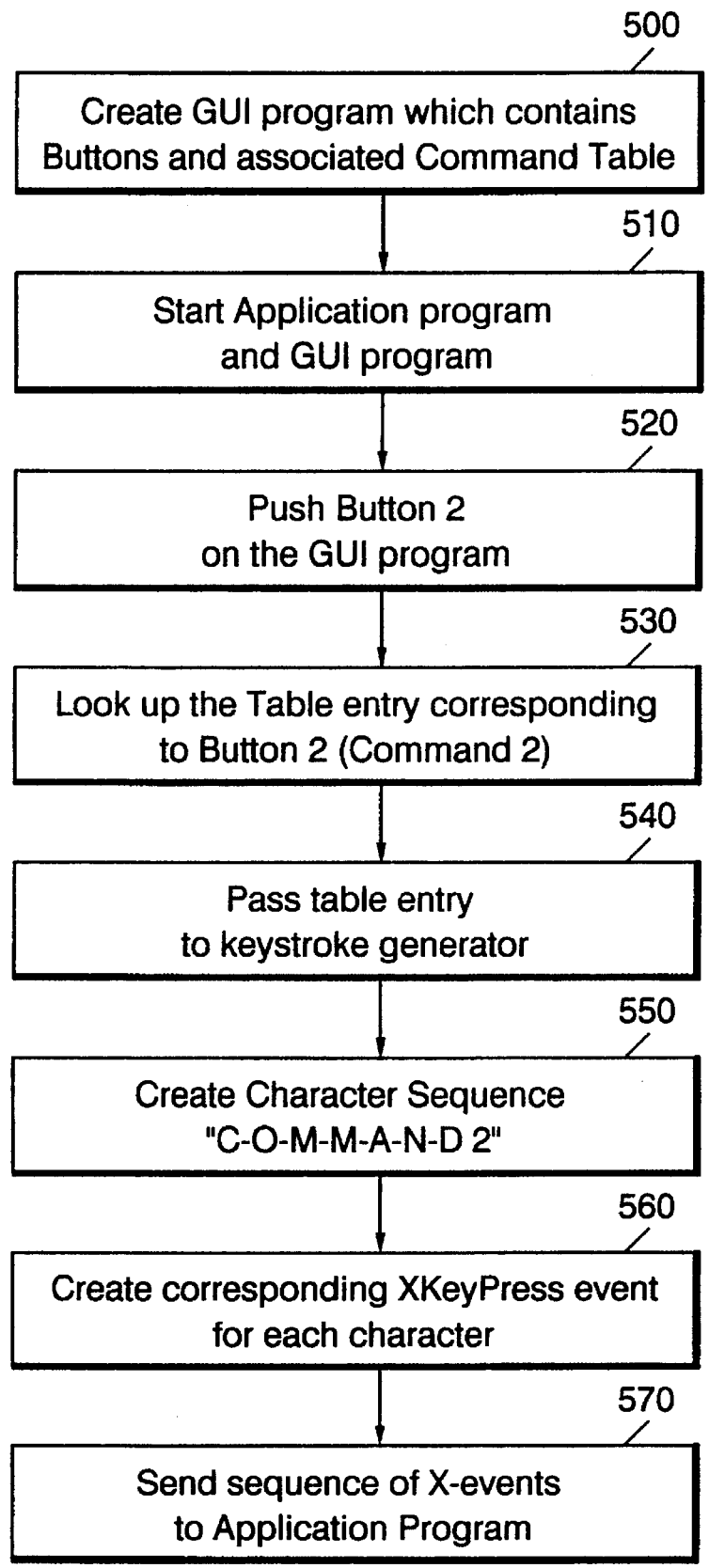
FIG. 2 is a flow diagram of the invention.

FIG. 2 herein, is a flow diagram of the invention which can be stored in the workstation. The initial step of the invention, 500, is the creation of a Table which provides a correspondence between each command of an application program and a button. The button/command association (table) is established by the GUI programmer. For example, the GUI may display a button which has the word "SAVE" on it. This could associate to an application command such as "STORE CURRENT CONTENTS IN FILE". Equivalently, a bitmap representing "SAVE" could be stored on the button. Table 1 is a representation of such a table.

The operation of the invention is as follows. The user, working in an X-Window environment, starts both the command line application and its associated GUI program identified in step 500. The application is now waiting for user input via a command line prompt and the GUI program is initialized with a selection of buttons. This is shown in step 510 of FIG. 2.

FIG. 3 is a graphical representation of an X-Window session as it might be viewed on a workstation display in step 510. There are two windows active on the representative display (1). Window 1 (10) is assigned to the Command Line Application, with its command-line area (12). Window 2 (20)) is the retrofitted GUI Window, displaying a plurality of buttons (22).

The user operates Command Line Application shown in Window 2 in the same manner as he did prior to the implementation of the invention. When the user wishes to execute Command 2 in the Command Line Application, he "presses" Button 2. That is, he moves the mouse pointer (25) on the screen by moving the mouse. When the pointer overlays the desired button, the user pushes the signal buttons (32) on the mouse. This sequence of actions is represented by step 520 in FIG. 2.

When Button 2 is pressed, the Button/Command Table is used to do a table look up and identify the command which is associated with Button 2 as shown in Step 530 of FIG. 2. The result of that table look-up, namely the table entry "Command 2" is then passed to a keystroke generator (Step 540 of FIG. 2). The keystroke generator converts the command into the characters that make up the command. In the case under discussion, "Command 2" is converted to a sequence:

"C" keystroke "o" keystroke "m" keystroke "m" keystoke "a" keystroke "n" keystoke "d" keystroke space/keystroke "2" keystoke enter/keystroke This is illustrated in step 550 of FIG. 2.

In step 560 of FIG. 2, a corresponding XKeyPress event is created for each of the characters. This event is a group of parameters which will be interpreted by the application program as a key being pressed on the command line. For example, one of the parameters indicates which key was pressed and another indicates if the CAPS key was also pressed. These XKeyPress events are then sent to the command line applications terminal window by using the X-Windows XSendEvent command which simulates the actual creation of the event.

These keystrokes are presented to the application program in the same manner as if the user had typed them in using the keyboard. Step 570 of FIG. 2. When the enter/keystroke is sent, the Command Line Application receives the keystrokes as if they were typed by the operator and executes them accordingly (i.e. processes the command). Thus, this process is totally transparent to the application program.

Steps 500 to 570 are illustrated graphically in FIG. 4. Thus, referring to FIG. 4, when a button 2 (100) is pressed on the retrofitted GUI, the invention uses a Button/Command Table (110) to identify the command associated with Button 2 by a table look-up. The result of that table look-up, namely Command 2 (112) is then passed (114) to a keystroke generator (120). The keystroke generator converts the command into the characters that make up the command, and then into X KeyPress events (130). The resulting command is sent to the application program. Accordingly, as shown in FIG. 2, "Command 2" (140) will appear on the command line (12) of Window 1 (10).

Table 2 is an example of a portion of the instructions referred to above, including instructions corresponding to steps 560 and 570 of FIG. 2 herein, to look up the associated button press and convert it to the correct command when Button 2 is pressed. This sample program is written in the C programming language as described in the publication *The C Programming Language* by Brian W. Kernighan and Dennis M. Ritchie, 1978 and also *X Window Systems Programming and Applications with Xt* by Douglas A. Young, 1989. These programs can be written in any other conventional program language that is supported by the X Window development environment.

It is within the scope of the invention, that the order of the steps of the flow diagram of FIG. 2 can be altered or other steps, providing for error routines, may be added, without changing the fundamental nature of the invention.

As can be seen from the above discussion, application programs that were written prior to the availability of Graphical User Interface (GUI) technology or that simply do not exploit the GUI technology can be easily retrofitted with a GUI by using this invention. This will make these applications easier to use and allow them to fit more transparently into an integrated GUI environment.

A benefit of this efficient, cost-effective method of providing GUIs is that the existing command-line application program itself is unchanged. As a result, those users that do not want to use the GUI to interact with the application need not start the GUI additional window. For them, the application will operate exactly as it had prior to the modification.

The invention has been described in reference to specific embodiments. Other embodiments, variations and modifications to the herein described invention will be apparent to those skilled in the art. For example, the invention can be implemented as part of the GUI program or implemented separately as a callable program. Similarly, although the invention has been described in terms of programs running on the workstation, it could also find application in programs running at a host computer or on a distributed network. Therefore, it is not intended that this invention should be limited except as indicated by the accompanying claims.

TABLE 1

| Button 1 | Command 1 |
|----------|-----------|
| Button 2 | Command 2 |
| Button 3 | Command 3 |
| Button 4 | Command 4 |
| . | . |
| . | . |
| Button n | Command n |

TABLE 2

| | |
|---|---|
| Subroutine_: | send_command in xcmd.c of aixtermx |
| Description: | This routine takes the passed command string and sends the corresponding X-Window keystroke events for each character in the command string. An enter keystroke is also sent if the type parameter has the value of ENTER. |
| Operation_: | This routine is called eith the cyntax:<br>send _command(command string, command type); |
| Parameters_: | This routine has the following parameters:<br>  msg - This is the command string that is to be sent to the terminal window<br>  type - This parameter has two acceptable values:<br>    o ENTER - This value tells the routine to include an Enter keystroke after all of the keystrokes for the command string have been sent<br>    o NOENTER - This value tells the routine return after the last keystroke from the command string is sent to the terminal window. |
| Returns_: | This routine does not return any value. |
| Algorithm_: | This routine works as follows:<br>  For each character in the passed command string (msg)<br>    Convert the character to an X_Window keystroke<br>    Send the keystroke to the terminal window<br>  If the type parameter has the value of ENTER<br>    Also send an Enter keystroke |

```
void send_command(msg,type)
char *msg;
int type;
{
static int              i=0,
                        rc=0,
                        slen=0;
static unsigned long    event_mask=KeyPressMask;
static KeySym           key_keysym;
XEvent key;
key.type=                KeyPress;
key.xkey.type=           KeyPress;
key.xkey.serial=         0;
key.xkey.send_event=     1;
key.xkey.display=        display;
```

TABLE 2-continued

```
key.xkey.window=         term_win;
key.xkey.root=           RootWindow(display,screen);
key.xkey.subwindow=      NULL;
key.xkey.time=           0;
key.xkey.x=              1;
key.xkey.y=
key.xkey.x_root=         0;
key.xkey.y_root=         0;
key.xkey.state=          0;
key.xkey.keycode=        NULL;
key.xkey.same_screen=1;
slen=strlen(msg);                                              /*Get the string length*/
for(i=0;i<slen;i++)                                            /*For each character */
{
key_keysym=(int)msg[i];                                        /*Get the character */
if(((key_keysym>=XK_A)&&                                       /*If upper case char */
(key_keysym<=XK_Z))||                                          /* Set shift mask */
(strchr("!@#$%-&*()_+{}|:\"<>?",msg[i])!=NULL))                key.xkey.state=ShiftMask;
else key.xkey.state=0;
key.xkey.keycode=XKeysymToKeycode(display,key_keysym);         /*Convert to keycode*/
rc=XSendEvent(display,term_win,FALSE,event_mask,&key);         /*Send to terminal */
}
if(type==ENTER)                                                /*If ENTER passed */
{
key.xkey.keycode=XKeysymToKeycode(display.XK_Return);          /*Make enter keycode*/
rc=XSendEvent(display,term_win,FALSE,event_mask,&key);         /*Send to terminal */
}
XFlush(display);                                               /*Flush events */
}
```

We claim:

1. In a graphic computer system comprised of a workstation with a display, a keyboard having a plurality of keys, a mouse which controls a mouse pointer on said display, a method for providing in a window environment a graphical user interface for executing a command-line application program, said program having a plurality of commands associated with it and using a command-line interface for receiving said commands, the method comprising the steps of:

(a) creating a table which associates with each of the plurality of commands of said command-line application to a specific graphical user interface button;

(b) initiating execution of the command-line application and a graphical user interface program for communication therebetween;

(c) providing in the display: a first window associated with said command-line application and displaying a command line; and a second window comprised of a display of each of said associated buttons;

(d) on the selection in the second window of a first button, using said table to identify said command associated with said first button;

(e) generating a message of associated characters from said identified command; and (f) sending said message to said application for execution whereby the buttons and the commands entered on the command line are transparent to the application and wherein the buttons and command line serve as simultaneously available alternative input means in the display for the command-line application.

2. A method as in claim 1 wherein said message is generated as follows:

(a) generating in a keystroke generator a sequence of characters, said sequence corresponding to the associated characters of said identified command;

(b) generating a message as an input to the command-line application, said message comprised of (i) a sequence of keystrokes, each keystroke identified with one of said characters and (ii) an enter keystroke.

3. The method as in claim 1 wherein, after said command is sent to said application, displaying said command on the command line of said display.

4. The method as in claim 1 wherein said second window displays a subset of said associated buttons.

5. The method as in claim 1 wherein said selection of a first button is performed by moving said mouse pointer to overlay and click on said first button on said display screen as an alternative input device for the application running the first window.

6. The method of claim 1 wherein the command-line application and the graphical user interface program communicate using a preselected command in the window environment.

7. A computer system responsive to graphical user and command line interface programs without rewriting any command-line application executable in the system, comprising:

(a) a workstation including a display, a keyboard, a graphical user input device and an operating system using a window environment;

(b) translation means relating each command of a command-line application to a specific input from the graphical input device;

(c) means initiating execution of a command-line application and the graphical user input device for communication therebetween;

(d) means for providing a first window and a second window in the display, the first window displaying a command-line and the second window displaying symbols responsive to the graphical input device;

(e) the translation means responsive to user selection of a symbol to identify a command associated with the selected symbol;

(f) means for generating a message of associated characters from said identified command; and (g) means for sending a message to said command-line application for execution by either the graphical user input device or the command line which serve as simultaneously available alternative input means in the display for executing the command-line application.

8. The computer system of claim 7 wherein the graphical user input device is a mouse and the symbols in the display are a plurality of buttons.

9. The computer system of claim 8 wherein the means for sending a message to the command-line application is a keystroke generator.

10. The computer system of claim 9 wherein the workstation is a host processor.

\* \* \* \* \*